United States Patent [19]

Arens

[11] Patent Number: 4,898,284

[45] Date of Patent: Feb. 6, 1990

[54] STORAGE DEVICE

[76] Inventor: Richard F. Arens, 12110 Timberlake Rd., Riverview, Fla. 33569

[21] Appl. No.: 222,061

[22] Filed: Jul. 8, 1988

[51] Int. Cl.[4] .......... B60R 11/06

[52] U.S. Cl. .......... 211/162; 296/3; 296/37.6; 224/281; 211/88; 211/94

[58] Field of Search .......... 296/37.1, 37.6, 24.1, 296/3, 18, 21; 224/281, 42.43, 42.44, 310; 211/88, 162, 94

[56] References Cited

U.S. PATENT DOCUMENTS

| | | | |
|---|---|---|---|
| 1,720,260 | 7/1929 | Bowen, Jr. et al. | 296/21 |
| 3,570,683 | 3/1971 | Dickgiesser | 211/162 |
| 3,912,086 | 10/1975 | de Bruyn | 211/162 |
| 3,945,510 | 3/1976 | Savl, Jr. et al. | 211/162 X |
| 4,030,609 | 6/1977 | Liebetrau et al. | 211/162 |
| 4,036,370 | 7/1977 | Chevaligr | 211/162 |
| 4,615,449 | 10/1986 | Naito et al. | 211/162 |

FOREIGN PATENT DOCUMENTS

| | | | |
|---|---|---|---|
| 2164610 | 3/1986 | United Kingdom | 296/37.1 |

*Primary Examiner*—Dennis H. Pedder
*Attorney, Agent, or Firm*—A. W. Fisher, III

[57] ABSTRACT

A storage device for use in a van comprising a stationary support frame having a storage carriage slidably mounted thereon. Support rollers attached to the carriage are offset vertically to limit lateral movement of the storage carriage as the storage carriage is moved between a retracted and extended position relative to the stationary support frame.

15 Claims, 3 Drawing Sheets

STORAGE DEVICE

BACKGROUND OF THE INVENTION

1. Field of the Invention

A storage device for use with a van comprising a stationary support frame secured to the interior of the van having a storage carriage slidably mounted thereon.

2. Description of the Prior Art

Vans or panel trucks are often used for commercial purposes such as the transport and storage of tools, equipment and other similar material. In addition, pickup trucks may be fitted with cap covers for similar purposes.

Unfortunately, vans and panel trucks include a single large cargo space. As a result, material placed in the cargo space can shift or slide during operation of such vehicles. Moreover, access to material in the cargo space is limited often requiring an individual to crawl into the cargo space to retrieve the desired material.

U.S. No. 4,705,315 discloses a slidable storage container mounted on an extension track which permits an operator to extract the storage container through the open cargo doors so that the storage container is easily accessible.

U.S. No. 3,360,136 shows a display panel frame including an upper and lower horizontal track having a series of vertically positioned, rectangular frames slidably mounted thereon.

U.S. No. 3,468,509 relates to a track mounting bracket having mounting tracks formed thereon to slidably support doors depending therefrom.

U.S. No. 4,305,695 discloses a slide or rollout tray including an array of castors between the deck and the tray to provide a slideout feature.

Additional examples of the prior art are shown in U.S. Pat. No. 690,698; U.S. Pat. No. 1,918,149; U.S. Pat. No. 3,883,004; U.S. Pat. No. 3,908,831; U.S. Pat. No. 4,228,906; U.S. Pat. No. 4,322,006; and U.S. Pat. No. 4,377,241.

SUMMARY OF THE INVENTION

The present invention relates to a storage device comprising a stationary support frame having a storage carriage slidably mounted thereon for use with a van or similar vehicle.

The stationary support frame comprises an upper and lower substantially horizontal support member each including a first and second support track held in spaced relationship by a plurality of substantially vertical support members. An upper guide and lower support element are affixed to the distal portions of the upper and lower substantially horizontal support members respectively.

The storage carriage comprises a substantially vertical storage panel having an upper and lower substantially horizontal carriage member affixed to the upper and lower portions thereof. The upper substantially horizontal carriage member includes a first carriage track formed thereon, while the lower substantially horizontal carriage member includes a first and second carriage track. An upper and lower carriage element are affixed to the proximal portions of the upper and lower substantially horizontal carriage member respectively.

The storage device may also include a first and second stop affixed to the lower and upper substantially horizontal support members to engage the lower carriage element when the storage carriage is retracted to limit the inward movement thereof and to engage the upper carriage element when the storage carriage is extended outwardly to limit the outward movement thereof respectively.

The storage device may further include a latch to secure the storage carriage in the retracted position.

When assembled, the upper guide and lower support element are disposed within the first carriage tracks of the upper and lower substantially horizontal carriage members respectively, while the upper and lower carriage members are disposed within the first and second support track of the upper and lower substantially horizontal support members respectively. As the storage carriage is moved between the retracted to extended position relative to the stationary support frame, the lateral and rotational movement therebetween is controlled by the upper guide, lower support element and upper and lower carriage elements.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
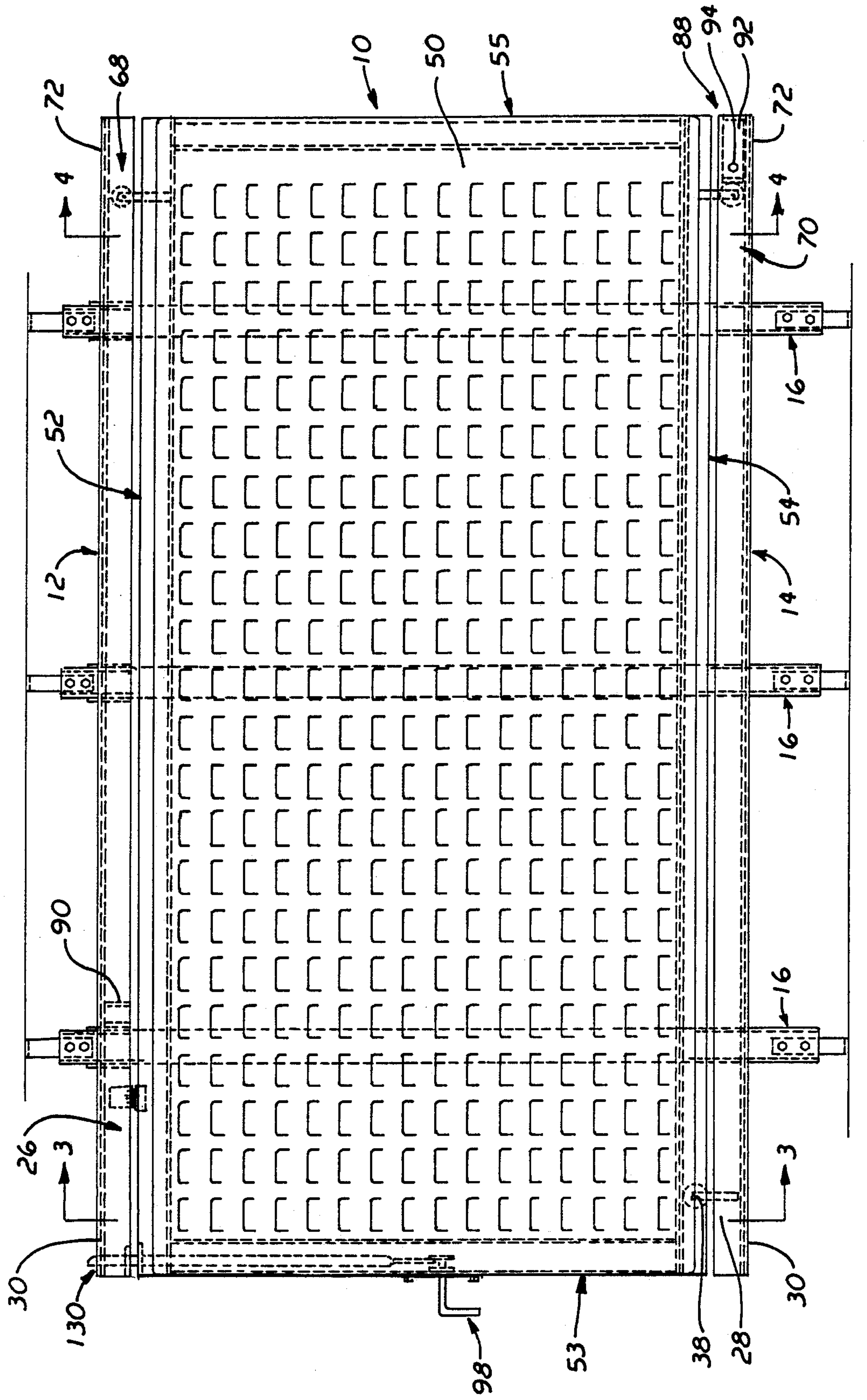
FIG. 1 is a front view of the storage device in the retracted position.
Figure 6:
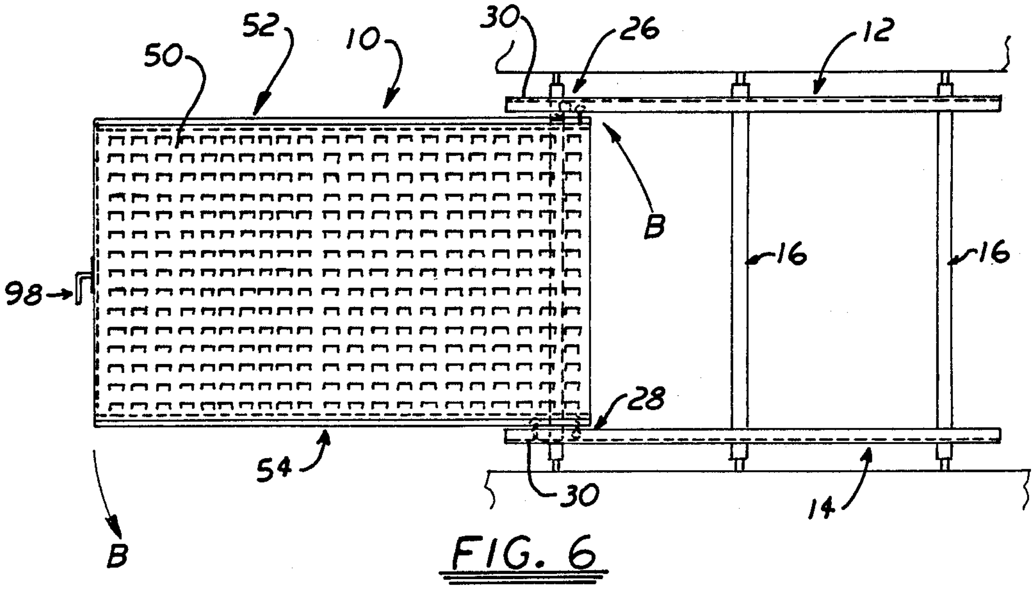
FIG. 6 is a front view of the storage device in the extended position.

As shown in FIGS. 1 and 6, the present invention relates to a storage device generally indicated as 10 for use with a van or similar vehicle. As described more fully hereinafter, the storage device 10 comprises a stationary support frame having a storage carriage slidably mounted thereon.

Figure 4:
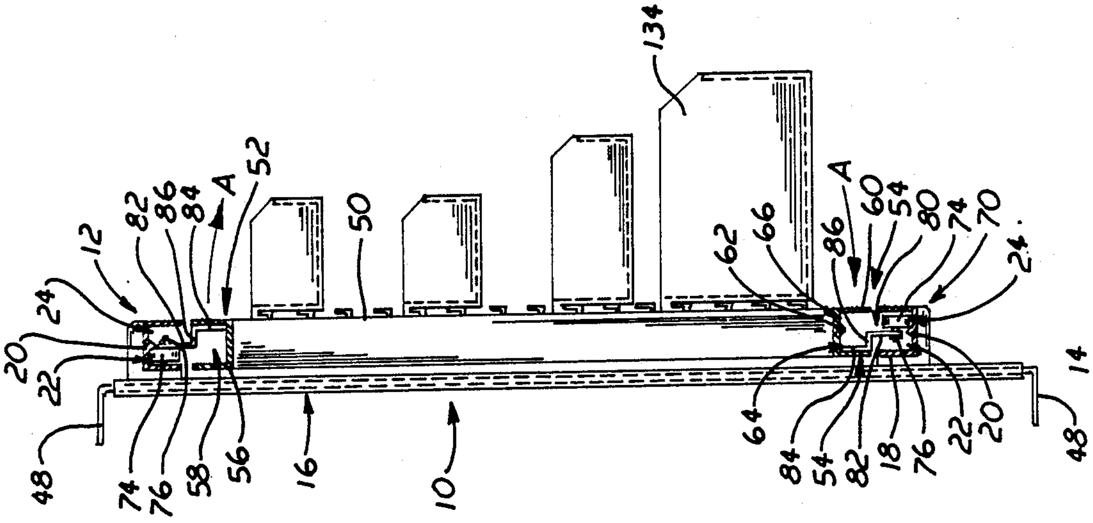
FIG. 4 is a distal end view of the storage device taken along line 4—4 of FIG. 1.
Figure 3:
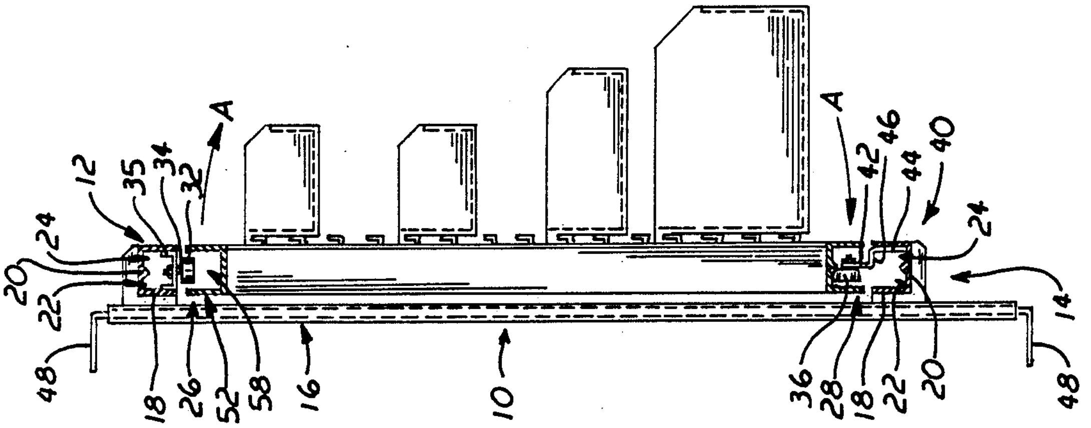
FIG. 3 is a distal end view of the storage device taken along line 3—3 of FIG. 1.
Figure 2:
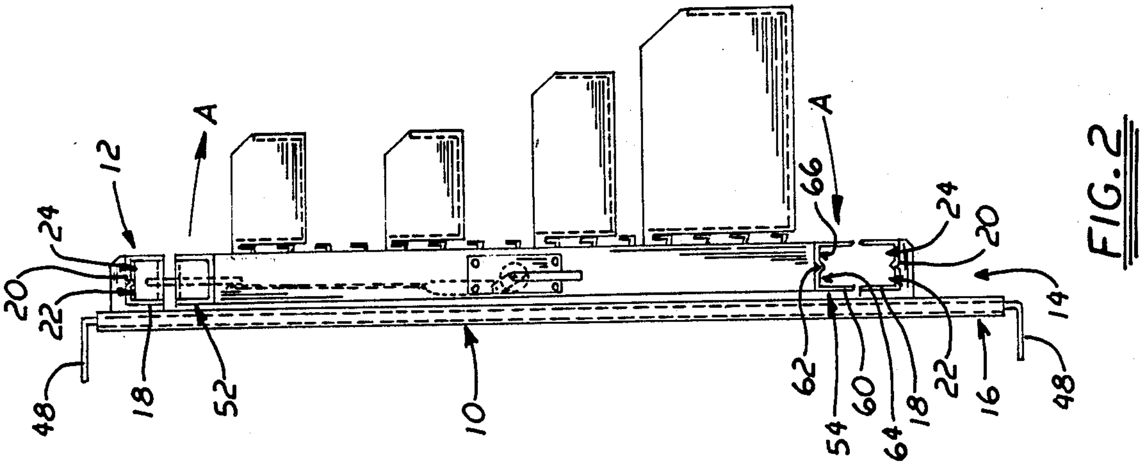
FIG. 2 is a distal end view of the storage device.

The stationary support frame comprises an upper and lower substantially horizontal support member generally indicated as 12 and 14 respectively held in spaced relationship by a plurality of substantially vertical support members each generally indicated as 16. As best shown in FIGS. 2 through 4, the upper and lower substantially horizontal support members 12 and 14 each comprises a substantially U-shaped support element 18 having a longitudinally disposed rail 20 formed therein to cooperatively form a first and second support track 22 and 24 respectively therewith.

As best shown in FIG. 3, an upper guide and lower support element generally indicated as 26 and 28 respectively are affixed to the distal portions 30 of the upper and lower substantially horizontal support members 12 and 14 respectively. The upper guide 26 comprises a horizontally disposed guide roller 32 rotatably mounted to the upper substantially horizontal support member 12 by a vertically disposed upper guide shaft 34 coupled to a bracket 35; while the lower support element 28 comprises a vertically disposed lower support roller 36 rotatably mounted to the lower substantially horizontal support member 14 by a horizontally disposed lower support shaft 38 coupled to a lower support bracket generally indicated as 40. The lower support bracket 40 comprises a first and second substantially vertical lower support bracket element indicated as 42 and 44 respectively held in parallel relationship relative to each other by a substantially horizontal interconnecting lower support element 46. As shown in FIG. 1, the upper guide 26 is offset inwardly relative to the lower support element 28.

The substantially vertical support members 16 are secured to the interior of the van by a plurality of securing brackets each indicated as 48.

The storage carriage comprises a substantially vertical storage panel 50 having an upper and lower substantially horizontal carriage member generally indicated as 52 and 54 respectively affixed to the upper and lower portions of the substantially vertical storage panel 50 respectively and a distal and proximal substantially vertical carriage member generally indicated as 53 and 55 respectively formed on opposite ends thereof.

As best shown in FIGS. 2 through 4, the upper substantially horizontal carriage member 52 comprises a substantially U-shaped carriage member 56 forming a first carriage track 58; while the lower substantially horizontal carriage member 54 comprises a substantially U-shaped carriage element 60 having a longitudinally disposed rail 62 formed therein to cooperatively form a first and second carriage track 64 and 66 respectively therewith. An upper and lower carriage element generally indicated as 68 and 70 respectively are affixed to the proximal portions 72 of the upper and lower substantially horizontal carriage members 52 and 54 respectively. The upper and lower carriage elements 68 and 70 each comprises a vertically disposed carriage roller 74 rotatably mounted to the upper and lower substantially horizontal carriage members 52 and 54 by a horizontally disposed carriage shaft 76 attached to an upper and lower carriage bracket generally indicated as 78 and 80 respectively. The upper and lower carriage brackets 78 and 80 each comprises a first and second substantially vertical carriage bracket elements indicated as 82 and 84 respectively held in parallel relationship relative to each other by a substantially horizontal interconnecting carriage element 86.

As shown in FIG. 1 the storage device 10 may also include a first and second stop generally indicated as 88 and 90 respectively affixed to the lower and upper substantially horizontal support members 14 and 12 respectively. The first stop 88 comprises a substantially rectangular stop member 92 secured within the second support track 24 of the lower substantially horizontal support member 14 by a fastening means indicated as 94 to engage the lower carriage element 70 when the storage carriage is retracted inwardly toward the proximal end 72 of the stationary support frame to limit the inward movement thereof. The second stop 90 comprises a substantially vertical stop member 96 removably secured within the second support track 24 of the upper substantially horizontal support member 12 to engage the upper carriage element 68 when the storage carriage is extended outwardly toward the distal end 30 of the stationary support frame to limit the outward movement thereof.

Figure 5:
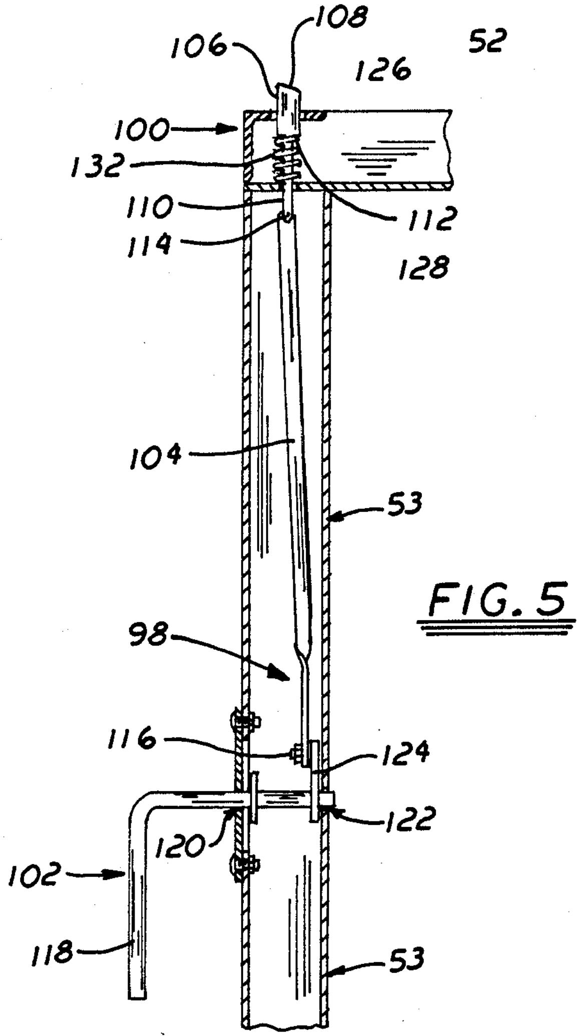
FIG. 5 is a side view of the latch mechanism.

As best shown in FIGS. 1 and 5, the storage device 10 may further include a latch generally indicated as 98 mounted on the distal substantially vertical carriage member 53 to selectively secure the storage carriage in the retracted position (FIG. 1). Specifically, the latch 98 comprises a latch member generally indicated as 100 operatively interconnected to a latch handle generally indicated as 102 by an interconnecting latch linkage 104. The latch member 100 comprises a latch element 106 having an inclined upper cam surface 108 and a lower reduced portion 110 cooperatively forming a bias seat 112. The interconnecting latch linkage 104 is pivotally coupled to the latch member 100 and latch handle 102 by coupling pins 114 and 116 respectively.

The latch handle 102 comprises an L-shaped latch handle 118 extending through apertures 120 and 122 formed in the distal substantially vertical carriage member 53 and a latch handle element 124. The latch element 106 is normally biased upwardly through a latch apertures 126 and 128 formed in the upper substantially horizontal carriage member 52 and a latch aperture 130 formed in the upper substantially horizontal support member 12 by a bias means 132.

As best illustrated in FIGS. 2 through 4 and 6, the storage carriage supporting a plurality of storage containers each indicated as 134 is subject to both lateral forces indicated as arrows A and pivotal forces indicated by arrows B as the storage carriage is moved between the retracted and extended positions as shown in FIGS. 1 and 6 respectively.

When assembled, the upper guide 26 and lower support element 28 are disposed within the first carriage tracks 58 and 64 of the upper and lower substantially horizontal carriage members 52 and 54 respectively (FIG. 3); while the upper and lower carriage elements 68 and 70 are disposed within the first and second support track 22 and 24 of the upper and lower substantially horizontal support members 12 and 14 respectively (FIG. 4). As the storage carriage is moved between the retracted to extended position relative to the stationary support frame, the lateral and pivotal movement therebetween is controlled by the engagement of the upper guide 26, lower support element 28 and upper and lower carriage elements 68 and 70 within the respective tracks.

The storage carriage is unlocked from the stationary support frame by rotating the L-shaped latch handle 118 against the force of bias means 132 to withdraw the latch element 106 from latch aperture 130 to permit movement of the stationary carriage relative to the stationary support frame.

Since the upper guide 26 is disposed inwardly relative to the lower support element 28, the storage carriage may be removed or dismounted from the stationary support frame by inward movement thereof when the first stop 88 is removed.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A storage device comprising a stationary support frame having a storage carriage slidably mounted thereon, said stationary support frame includes an upper and lower substantially horizontal support member each having a first and second support track formed thereon held in spaced relationship by a plurality of substantially vertical support members and an upper guide and a lower support element affixed to said upper and lower substantially horizontal support members respectively, said storage carriage includes a substantially vertical storage panel to support a plurality of storage containers thereon affixed between an upper and substantially horizontal carriage member having a first carriage track formed thereon and a lower substantially horizontal carriage member having a first and second carriage track formed thereon formed thereon and an upper and lower carriage element affixed to said upper and lower substantially horizontal carriage members respectively, said upper guide and lower support elements are disposed within said first carriage track of said upper and lower substantially horizontal carriage members respectively and said upper and lower carriage elements in offset relationship relative to each other in the vertical plane are disposed within said first and second support track of said upper and lower substantially horizontal support member respectively to limit lateral and rotational movement of said storage carriage as said storage carriage is moved between a retracted and extended position relative to said stationary support frame.

2. The storage device of claim 1 wherein said upper and lower substantially horizontal support members each comprises a substantially U-shaped support element having a longitudinally disposed rail formed therein to cooperatively form said first and second support tracks.

3. The storage device of claim 2 wherein said upper substantially horizontal carriage member comprises a substantially U-shaped carriage member forming said first carriage track and said lower substantially horizontal carriage member comprises a substantially U-shaped carriage element having a longitudinally disposed rail formed therein to cooperatively form said first and second carriage track.

4. The storage device of claim 3 wherein said upper guide comprises a horizontally disposed guide roller rotatably mounted to said upper substantially horizontal support member and said lower support element comprises a vertically disposed lower support roller rotatably mounted to the lower substantially horizontal support member.

5. The storage device of claim 4 wherein said vertically disposed lower support roller is mounted to a horizontally disposed lower support shaft coupled to a lower support bracket.

6. The storage device of claim 5 wherein said lower support bracket comprises a first and second substantially vertical lower support bracket element formed in parallel relationship relative to each other by a substantially horizontal interconnecting lower support element.

7. The storage device of claim 6 wherein said upper guide is offset relative to said lower support element.

8. The storage device of claim 4 wherein said upper and lower carriage elements each comprises a vertically disposed carriage roller rotatably mounted to said upper and lower substantially horizontal carriage member.

9. The storage device of claim 8 wherein each said vertically disposed carriage rollers is mounted on horizontally disposed carriage shaft attached to an upper and lower carriage bracket respectively.

10. The storage device of claim 9 wherein said upper and lower carriage brackets each comprises a first and second substantially vertical carriage bracket elements formed in parallel relationship relative to each other by a substantially horizontal interconnecting carriage element.

11. The storage device of claim 1 further including a first end stop affixed to said lower substantially horizontal support member disposed to engage said lower carriage element when said storage carriage is retracted inwardly toward the proximal end of said stationary support frame to limit the inward movement thereof.

12. The storage device of claim 11 further including a second stop secured to said second support track of said upper substantially horizontal support member disposed to engage said upper carriage element when said storage carriage is extended toward the distal end of said stationary support frame to limit the outward movement thereof.

13. The storage device of claim 1 wherein said storage carriage further includes a distal and proximal substantially vertical carriage member formed on opposite ends of said substantially vertical storage panel.

14. The storage device of claim 13 further including a latch movable between a first and second position mounted on said distal substantially vertical carriage member to selectively secure said storage carriage in the retracted position, said latch comprising a latch member operatively interconnected to a latch handle by an interconnecting latch linkage such that when said latch is in said first position said latch member extends through an aperture formed in said upper substantially horizontal support member and when said latch is in said second position said latch member is retracted from said aperture.

15. The storage device of claim 14 wherein said latch member comprises a latch element having an inclined upper cam surface and a lower reduced portion cooperatively forming a bias seat to receive a bias means to normally bias said latch in said first position.

* * * * *